United States Patent [19]

Hughan et al.

[11] Patent Number: 4,885,266
[45] Date of Patent: Dec. 5, 1989

[54] ZIRCONIA CERAMIC MATERIALS AND METHOD FOR MAKING SAME

[75] Inventors: Robert R. Hughan, Glen Iris; Richard H. J. Hannink, Oakleigh; Michael V. Swain, East Malvern; Robert K. Stringer, Heidelberg; Michael J. Murray, Surrey Hills; Ronald C. Garvie, Beaumaris, all of Australia

[73] Assignee: Commonwealth Scientific and Industrial Research Organization, Campbell, Australia

[21] Appl. No.: 218,419
[22] PCT Filed: May 27, 1983
[86] PCT No.: PCT/AU83/00069
§ 371 Date: Feb. 1, 1984
§ 102(e) Date: Feb. 1, 1984
[87] PCT Pub. No.: WO83/04247
PCT Pub. Date: Dec. 8, 1983

Related U.S. Application Data

[63] Continuation of Ser. No. 4,255, Jan. 5, 1987, abandoned, which is a continuation of Ser. No. 582,567, Feb. 1, 1984, abandoned.

[30] Foreign Application Priority Data

Jun. 1, 1982 [AU] Australia .................. PF4238

[51] Int. Cl.⁴ .............................. C04B 35/48
[52] U.S. Cl. ...................... 501/104; 264/65; 423/266; 423/608
[58] Field of Search .......... 501/104; 264/65; 423/266, 608

[56] References Cited

U.S. PATENT DOCUMENTS

| | | | |
|---|---|---|---|
| 2,040,215 | 5/1936 | Rava | 501/103 |
| 3,365,317 | 1/1968 | Yavorsky | 264/30 |
| 3,887,387 | 6/1975 | Sturhahn | 501/104 |
| 4,035,191 | 7/1977 | Johns | 106/57 |
| 4,219,359 | 8/1980 | Miwa et al. | 106/57 |
| 4,279,655 | 7/1981 | Garvie et al. | 106/57 |
| 4,344,904 | 8/1982 | Yamada et al. | 501/104 |
| 4,360,598 | 11/1982 | Otagiri et al. | 423/266 |
| 4,513,089 | 4/1985 | Kummer et al. | 501/104 |
| 4,525,464 | 6/1985 | Claussen et al. | 501/104 |

FOREIGN PATENT DOCUMENTS 0071670 5/1980 Japan .................. 501/104

OTHER PUBLICATIONS

Duwez et al, "Stabilization of Zirconia with Calcia and Magnesia", J. Am. Chem. Soc. (5–1952), vol. 35, No. 5, pp. 107–113.

Drennan et al, "Effect of SrO Additions on the Grain Boundary Microstructure and Mechanical Properties of Magnesia-Partially-Stabilized Zirconia", J. Am. Ceramic Soc., V 69, 7, pp. 541–546, Jul. 1986.

Primary Examiner—John F. Niebling
Assistant Examiner—Steven P. Marquis
Attorney, Agent, or Firm—Sughrue, Mion, Zinn, Macpeak & Seas

[57] ABSTRACT

Magnesia partially stabilized zirconia materials, having a cubic phase zirconia content in the range 70 to 25 percent (by volume) and a metal oxide additive which forms an insoluble zirconate, and a microstructure in the form of grains of stabilized cubic phase zirconia containing precipitates of tetragonal phase zirconia, are produced for use at low (less than 400° C.) intermediate (between 400° C. and 700° C.), high (700° C. to 1000° C.) or very high (greater than 1000° C.) temperatures. The higher the temperature of use of the ceramic material, the more the tetragonal precipitates need to be transformed into monoclinic phase zirconia. The extent to which the tetragonal precipitates are transformed is controlled by the way in which a fired, pressed mixture of the ceramic components is cooled from about 1400° C. to about 1000° C. An "ageing" of the ceramic material may be effected by an isothermal hold, preferably at 1350° C. and then at 1100° C., in the course of cooling to room temperature. Alternatively the ageing may be effected after first cooling the material to below 800° C.

19 Claims, No Drawings

ZIRCONIA CERAMIC MATERIALS AND METHOD FOR MAKING SAME

This is a continuation application of Ser. No. 07/004,255, filed Jan. 5, 1987, now abandoned which is a continuation of application Ser. No. 06/582,567, filed as PCT AU83/00069 on May 27, 1983, published as WO83/04247 on Dec. 8, 1984 now abandoned.

TECHNICAL FIELD

This invention concerns ceramic materials used in engineering applications. More particularly it concerns zirconia ceramics which are partially stabilised with magnesia and which have high strength and good thermal shock resistance.

BACKGROUND TO THE INVENTION

In the specification of U.S. Pat. No. 4,279,655, magnesia partially stabilised zirconia ceramic materials, which possess good thermal shock resistance and high strength and wear resistance, are described. As noted in that specification good thermal shock resistance and high physical strength had, for many years, been regarded as mutually exclusive properties of ceramic materials. However, by producing materials with a specified microstructure, this hitherto unforseen combination of physical properties was found to be achievable.

In some situations where ceramic materials may be used, it is not necessary for the ceramic material to possess both exceptional strength and good thermal shock resistance. For example, for low temperature applications, such as in wire drawing and in bioceramics (synthetic joints for humans and animals), the strength and wear resistance of the ceramic is more important than its thermal shock resistance, but for high temperature applications, such as extrusion dies for brass, copper and steel, thermal shock resistance and reasonable strength are the essential attributes of the materials.

Most uses of ceramic materials can be categorised by reference to the temperature range in which the material is to function. To illustrate this point, examples of applications of ceramic materials are provided in Table 1 below (which is not intended as an exhaustive listing of the applications of ceramic materials).

TABLE 1

| TEMPERATURE OF USE | APPLICATIONS |
| --- | --- |
| Low temperature (Room temperature to about 400° C.) | Bio-prosthesis devices; dry bearings; wear resistant lining and tiles; guides for wire bars and threads; sizing tools for the powder metallurgy industry; scraper blades for the coal industry and other mining industries; tappet (cam follower) facings; valve guides, valves and seals; nozzles for autoclaves, (for example in paper making); nozzles for slingers and hydro-cyclones; dies for wire drawing, cold tube drawing, powder compaction and injection moulding of plastics; pump (including slurry pump) liners, spindles, seals and pistons; abrasive and corrosive chemical handling apparatus. |
| Intermediate temperatures (from about 400° C. to about 700° C.) | Engine components such as valve guides and cylinder liners; powder extrusion dies; dies for hot extrusion of aluminium metal; some induction heating equipment components; non-ferrous liquid metal pump parts. |
| High temperatures (from about 700° C. to about 1000° C.) | Brass, copper and steel extrusion dies; engine components such as hot plates, piston tops and valve seats; non-ferrous liquid metal pump parts. |
| Very high temperatures (in excess of 1000° C.) | Dies for extrusion of steel, zirconium, titanium and other difficult metals. |

It is an objective of the present invention to provide ceramic materials which have properties that make them particularly suitable for use in a required temperature range.

DISCLOSURE OF THE PRESENT INVENTION

The present inventors have found that to produce magnesia partially stabilised zirconia ceramics that have exceptional thermal shock resistance, a material that has a microstructure of the material described in the specifications of U.S. Pat. No. 4,279,655 may be used, but the amount of monoclinic zirconia within the grains of the ceramic material (that is, excluding monoclinic zirconia in the grain boundaries) has to be increased.

This discovery has enabled the present invention to develop a range of partially stabilised zirconia ceramics which are suitable for particular uses (see Table 1). The common features of these newly developed ceramics is that (a) they have a cubic zirconia content in the range from 70 percent to 25 percent (by volume), with the remainder of the zirconia being in the tetragonal or monoclinic phase, (b) they contain magnesia as a stabilising compound, in the range of from 3.0 to 3.65 percent (by weight), and (c) they also contain an additive which is strontia, baria or a rare earth oxide which is (a) a glass former with silica, (b) insoluble in zirconia, and (c) does not react with the stabilizing magnesia. Mixture of such additives may be used. Each such additive acts as an inhibitor of the decomposition of the partially stabilized zirconia by removing silica and silica compounds (for example, fosterite, $Mg_2SiO_4$) from the grain boundaries, thereby preventing these compounds from acting as nucleating agents for the decomposition reaction. The additive content is in the range from 0.05 to 1.00 percent (by weight of the ceramic material).

In its action as an inhibitor, the additive is believed to act as an inhibitor of grain growth during sintering, and as an inhibitor of classical eutectoid decomposition, which nucleates in the grain boundaries. It has also been observed that oxides which react with silica express silica on to the surface of the ceramic material, and thus have the beneficial effect of purifying the bulk material.

The production of a required amount of monoclinic zirconia in the matrix of the grains of the ceramic materials is effected by ageing the materials (where this term used in the classical metallurgical sense). For convenience, the monoclinic zirconia within the grains of cubic stabilised zirconia will be referred to, in this specification, as "grain matrix monoclinic" zirconia. Any one of a number of heat treatment paths may be used, in accordance with the method of the present invention, to ensure that the desired properties of the final product are achieved.

The silica content of the new materials of the present invention is not as critical as in the ceramic materials described and claimed in the specification of U.S. Pat. No. 4,279,655. Up to 1.0 percent (by weight) of silica is acceptable in the final products, although lower silica contents are preferred.

According to the present invention, a ceramic material suitable for use in high strength, low temperature applications comprises magnesia partially stabilised zirconia in which:
(a) the cubic phase zirconia content of the material is in the range from 70 percent (by volume) to 25 percent (by volume) of the ceramic material; and
(b) the magnesia content of the material is in the range from 3.0 percent (by weight) to 3.65 percent (by weight);
the material being characterised in that:
(c) it contains an additive, which is strontia baria, or a rare earth oxide which is a glass former with silica, is insoluble in zirconia and does not react with the stabilizing magnesia, in the range from 0.05 percent (by weight) to 1.00 percent (by weight);
(d) the microstructure of the material comprises grains of cubic stabilised zirconia, each grain containing precipitates of tetragonal zirconia which is transformable on the application of a tensile stress or upon heat treatment to monoclinic zirconia, said precipitates being lenticular in shape and having an average length of about 150 nm in their longest dimension, and each grain containing grain matrix monoclinic zirconia as transformed tetragonal zirconia precipitates in the range from 0 to 10 percent (by volume); and
(e) a ground surface of the ceramic material contains from 0 to 40 percent (by volume) monoclinic zirconia and a polished surface of the ceramic material contains from 0 to 10 percent (by volume) monoclinic zirconia.

It is a characteristic of such materials (and the other ceramic materials of the present invention) that the matrix material in which the tetragonal precipitates form contains an ordered delta phase.

In most instances, the grains of the ceramic material will be separated from each other by a boundary material. In such cases, the grain boundary material will contain monoclinic zirconia in the range from 0 to 10 percent, by volume, of the ceramic material (the grain boundary monoclinic zirconia content should be as low as possible). The remainder of the grain boundary material consists of zirconates and silicates, either crystalline or glassy.

Those skilled in this art will be aware that the surface of a material that is produced by grinding or by polishing can vary in its structure according to the coarseness of the grinding or polishing medium and the cutting rate of the grinding or polishing process.

Accordingly, throughout this specification, the term "ground surface" means a surface that has been prepared using a "RESIMET" (trade mark) grinding wheel type D107W-F-50A01-3M, manufactured by Impregnated Diamond Products Limited, of Gloucester, England, operating at a lineal surface speed of 19.3 meters per second, and removing about 100 micrometers of material per pass.

Also, throughout this specification, the term "polished surface" means a surface that has been prepared using a polishing wheel which is constructed of tin metal, using 1 micron diamond paste with a load of 0.5 kg per sq. cm. for a polishing time of 60 minutes, to obtain a stable surface.

It is also appropriate at this point in this specification to define other terms that will be used in describing the present invention, and to indicate the methodology used to obtain the values of some parameters quoted in connection with the present invention. "Good thermal upshock" means a retained strength, tested in 4-point bending, after thermal upshock of a bar of ceramic material measuring 3 mm by 3 mm by 40 mm, which is at least 40 percent of the original strength of the material.

"Thermal upshock" means subjecting samples to 20 cycles of plunging the samples at a temperature between room temperature and 450° C. into a bath of molten aluminium at 900° C., and then removing the material from the aluminium bath and then allowing the samples to cool to below 450° C. before the next cycle.

Measurement of overall monoclinic zirconia in a surface layer is obtained by examination of the ground surface or polished surface of the ceramic material using the x-ray diffraction technique of R. C. Garvie and P. S. Nicholson, described in their paper "Phase analysis in zirconia systems", published in the 1972 issue of the "Journal of the American Ceramic Society". The grain boundary monoclinic zirconia content, defined as the product of the decomposition reaction at temperatures between 1050° C. and 1350° C., is measured optically on the etched surface, using the line intercept method. The grain matrix monoclinic zirconia content is calculated by subtracting the grain boundary monoclinic zirconia content from the polished surface monoclinic zirconia content. The transformable tetragonal zirconia content of the grains of the ceramic material is the difference between the overall monoclinic zirconia content measured by the x-ray diffraction technique using the ground surface of the material and the overall monoclinic zirconia content measured by the x-ray diffraction technique using the polished surface of the material.

Reverting now to the "high strength, low temperature" ceramic material defined above, it should be noted that:
(a) the preferred grain matrix monoclinic zirconia of the grains is less than 5 percent by volume of the ceramic material;
(b) the grain boundary monoclinic zirconia content is preferably less than 2 percent by volume of the ceramic material;
(c) the ground surface monoclinic zirconia content is preferably in the range from 15 percent to 30 percent by volume of the ceramic material;
(d) the polished surface monoclinic zirconia content is preferably less than 5 percent by volume of the ceramic material, leaving the maximum amount of transformable tetragonal zirconia for the transformation toughening process;
(e) the magnesia content of the material is preferably in the range from 3.3 percent to 3.5 percent by weight of the ceramic material;
(f) the additive content of the material is preferably in the range 0.25 percent (by weight) to 0.70 percent (by weight); and
(g) the silica content of the ceramic material is preferably less than 0.5 percent (by weight), more preferably less than 0.25 percent (by weight), and even more preferably less than 0.10 percent (by weight) of the ceramic material.

According to a second aspect of the present invention, a ceramic material suitable for use at temperatures in the range 400° C. to 700° C. comprises magnesia partially stabilised zirconia in which:
(a) the cubic phase zirconia content of the material is in the range from 70 percent (by volume) to 25 percent (by volume) of the ceramic material; and
(b) the magnesia content of the material is in the range from 3.0 percent (by weight) to 3.65 percent (by weight);

the material being characterised in that:
(c) it contains an additive, which is strontia, baria or a rare earth oxide which is a glass former with silica, is insoluble in zirconia and does not react with the stabilizing magnesia, in the range from 0.05 percent (by weight) to 1.00 percent (by weight);
(d) the microstructure of the material comprises grains of cubic stabilised zirconia, each grain containing precipitates of tetragonal zirconia which is transformable on the application of a tensile stress or upon heat treatment to monoclinic zirconia, said precipitates being lenticular in shape and having an average length of about 150 nm in their longest dimension, and each grain containing grain matrix monoclinic zirconia as transformed tetragonal zirconia precipitates in the range from 5 to 40 percent (by volume) of the ceramic material; and
(e) a ground surface of the ceramic material contains from 25 to 50 percent (by volume) monoclinic zirconia and a polished surface of the ceramic material contains from 5 to 50 percent (by volume) monoclinic zirconia.

This "intermediate temperature range" ceramic material (that is, the material for use in the temperature range 400° C. to 700° C.), in its preferred form, has the following parameters:
(a) a magnesia content of from 3.3 to 3.5 percent (by weight);
(b) an additive content of from 0.25 to 0.70 percent (by weight);
(c) a grain matrix monoclinic zirconia content of from 5 to 25 percent (by volume);
(d) a grain boundary monoclinic zirconia content in the range from 0 to 20 percent (by volume), and more preferably less than 10 percent (by volume);
(e) a ground surface monoclinic zirconia content of from 25 to 45 percent (by volume);
(f) a polished surface monoclinic zirconia content of from 10 to 35 percent (by volume); and
(g) a silica content of less than 0.5 percent (more preferably less than 0.25 percent, and even more preferably less than 0.10 percent (by weight).

According to a third aspect of the present invention, a ceramic material suitable for use at temperatures in the range 700° C. to 1000° C. comprises magnesia partially stabilised zirconia in which:
(a) the cubic phase zirconia content of the material is in the range from 70 percent (by volume) to 25 percent (by volume) of the ceramic material; and
(b) the magnesia content of the material is in the range from 3.0 percent (by weight) to 3.65 percent (by weight);

the material being characterised in that:
(c) it contains an additive, which is strontia, baria, or a rare earth oxide which is a glass former with silica, is insoluble in zirconia and does not react with the stabilizing magnesia, in the range from 0.05 percent (by weight) to 1.00 percent (by weight);
(d) the microstructure of the material comprises grains of cubic stabilised zirconia, each grain containing precipitates of tetragonal zirconia which is transformable on the application of a tensile stress or upon heat treatment to monoclinic zirconia, said precipitates being lenticular in shape and having an average length of 150 nm in their longest dimension, each grain containing grain matrix monoclinic zirconia as transformed tetragonal zirconia precipitates in the range from 10 to 50 percent (by volume); and
(e) a ground surface of the ceramic material contains from 25 to 60 percent monoclinic zirconia and a polished surface of the ceramic material contains from 10 to 60 percent monoclinic zirconia.

This "high temperature range" ceramic material preferably has
(a) a magnesia content of from 3.3 to 3.5 percent by weight (more preferably about 3.4 percent);
(b) an additive content of from 0.25 to 0.70 percent (by weight);
(c) a grain matrix monoclinic zirconia content of from 10 to 40 percent (by volume);
(d) a grain boundary monoclinic zirconia content in the range from 0 to 35 volume percent, more preferably less than 15 volume percent;
(e) a ground surface monoclinic zirconia content of from 30 to 60 volume percent;
(f) a polished surface monoclinic zirconia content of from 25 to 60 volume percent; and
(g) a silica content of less than 0.5 percent (by weight), more preferably less than 0.25 percent, and even more preferably less than 0.10 percent.

According to a fourth aspect of the present invention, a ceramic material which may be used for short times at temperatures in excess of 1000° C. comprises magnesia partially stabilised zirconia in which
(a) the cubic phase zirconia content of the material is in the range from 70 percent (by volume) to 25 percent (by volume) of the ceramic material; and
(b) the magnesia content of the material is in the range from 3.0 percent (by weight) to 3.65 percent (by weight);

the material being characterised in that:
(c) it contains an additive, which is strontia, baria, or a rare earth oxide which is a glass former with silica, is insoluble in zirconia and does not react with the stabilizing magnesia, in the range from 0.05 percent (by weight) to 1.00 percent (by weight);
(d) the microstructure of the material comprises grains of cubic stabilised zirconia, each grain containing precipitates of tetragonal zirconia which has been transformed upon heat treatment to monoclinic zirconia, said precipitates being lenticular in shape and having an average length in their longest dimension of about 150 nm, and each grain containing grain matrix monoclinic zirconia as transformed tetragonal zirconia precipitates in the range from 15 to 60 percent by volume; and
(e) a ground surface of the ceramic material contains from 15 to 75 percent (by volume) monoclinic zirconia and a polished surface of the ceramic material contains from 5 to 75 percent (by volume) monoclinic zirconia.

Such "very high temperature range" ceramic materials preferably have
(a) a magnesia content of from 3.3 to 3.5 percent (by weight);

(b) an additive content of from 0.25 to 0.70 percent (by weight);
(c) a grain matrix monoclinic zirconia content of from 20 to 45 percent (by volume);
(d) a grain boundary monoclinic zirconia content of less than 30 percent (by volume) (more preferably less than 10 volume percent);
(e) a ground surface monoclinic zirconia content of from 35 to 65 percent (by volume);
(f) a polished surface monoclinic zirconia content of from 35 to 65 percent (by volume); and
(g) a silica content of less than 0.5 percent (by weight), more preferably less than 0.25 percent (by weight), and even more preferably less than 0.10 percent (by weight).

The present invention also encompasses a method of manufacture of the ceramic materials of the present invention. According to this aspect of the present invention, a method of making a magnesia partially stabilised zirconia material comprises the sequential steps of:

1. mixing and wet-milling a mixture of zirconium dioxide powder, magnesium oxide powder and an additive oxide powder containing no more than 1.0 percent by weight of silica, or materials capable of producing, on firing, zirconium dioxide, magnesium oxide and an additive oxide which is strontia, baria, or a rare earth oxide that is a glass former with silica, is insoluble in zirconia and does not react with the stabilizing magnesia, in proportions such that the effective magnesium oxide content comprises from 3.0 wt percent to 3.65 wt percent of the mixture and the additive oxide content of the mixture is in the range from 0.05 wt percent to 1.00 wt percent;
2. moulding the mixture into a desired shape;
3. firing the moulded mixture at a temperature in the range from about 1550° C. to about 1900° C.;
4. cooling the fired material from the firing temperature to about 1400° C. at a rate which avoids cracking of the moulded article, but is sufficiently rapid that, if this cooling rate should be maintained until the material reaches room temperature, precipitates of tetragonal zirconia that are formed in the grain matrix would remain in the tetragonal phase;
5. thereafter cooling the fired material from about 1400° C. to about 1000° C., at a rate which enables lenticular tetragonal precipitates to grow (on average) to about 150 nm in their longest dimension; and
6. thereafter allowing the material to cool to room temperature at a cooling rate which does not result in cracking of the product.

During step 6, some of the tetragonal zirconia precipitates may be transformed into monoclinic zirconia.

Ceramacists will appreciate that the cooling rates in steps 4 and 6 depend upon the size of the moulded article, but they can be determined readily, by experiment, for a specific product.

The cooling step 5 may be varied by interrupting the cooling rate and holding the moulded material at the temperature of interruption for a predetermined period. Preferably such an isothermal hold will be effected at about 1350° C. and again at about 1100° C. The purpose of an isothermal hold is to control the extent to which tetragonal precipitates grow in the grain matrix and to minimise grain boundary decomposition.

Another variation of the cooling step 5 is to cool the fired material at a predetermined rate from about 1400° C. to 800° C. or lower, then to increase the temperature of the material to a temperature in the range from about 1000° C. to about 1150° C., and hold the material at that increased temperature (the ageing temperature) for a predetermined period, to control the extent to which precipitates of tetragonal zirconia in the grain matrix are transformed into monoclinic zirconia. A typical ageing temperature is 1100° C.

It will be appreciated that by controlling the transformation of the precipitates of tetragonal zirconia into monoclinic zirconia, the amount of grain matrix monoclinic zirconia in the final product can be controlled. Thus a partially stabilised zirconia product, which has properties which are especially suited to the use for which that product is intended, can be produced.

It should be noted that in the cooling steps of the method of the present invention, it is not necessary for the cooling rates to be linear.

EXAMPLES ILLUSTRATING THE PRESENT INVENTION

EXAMPLE 1

To Demonstrate the Effect of the Additive

A series of samples of magnesia partially stabilised zirconia material were prepared using the method defined above, with a single isothermal hold (ageing) at 1100° C. in the cooling step 5. In each sample the starting material was a commercially available zirconia and the magnesia content was 3.4 percent (by weight). Each sample comprised 150 bars of material, which were used to obtain experimental data. Some of the bars in each sample were not subjected to ageing at 1100° C., so that as-fired properties of non-aged specimens could be measured. Strontia was the additive in each sample except one; that one sample was made with zero additive. Table 2 summarises the result of tests made in the laboratory with the samples of material.

TABLE 2

| Sample No. | 14 | 3 | 7 |
| --- | --- | --- | --- |
| Strontia content (wt. percent) | 0 | 0.25 | 0.5 |
| Firing temperature (°C.) | 1700 | 1700 | 1700 |
| As-fired MORi (in Kpsi) | 57 | 101 | 78 |
| As-fired GSM content (%) | 14 | 12 | 12 |
| As-fired MORr (after thermal upshock) | low | low | low |
| Ageing temp. (degrees C.) | 1100 | 1100 | 1100 |
| Ageing time (hours) | 1 | 2 | 8 |
| Aged MORi (in Kpsi) | 68 | 107 | 101 |
| Aged GSM content (%) | 14 | 22 | 28 |
| PQ MORr (Kpsi) | 59 | 86 | 84 |

Note: PQ is the peak value after quenching;
MORi is the initial modules of rupture (that is, before thermal upshock);
MORr is the retained modules of rupture (that is, after thermal upshock).

These data show that when magnesia partially stabilised zirconia ceramic materials have the same or similar as-fired ground surface monoclinic zirconia content, the additive content has a substantial influence on the strength of the as-fired material.

EXAMPLE 2

An Illustration of Low Temperature Materials

Magnesia partially stabilised zirconia materials having the composition of sample 3 of Example 1 were fabricated in the form of autoclave nozzles for the paper manufacturing industry and also in the form of metal powder compaction dies.

The autoclave nozzles were supplied to a paper manufacturer for testing. These nozzles were able to perform for three months in their intended environment, which compared very favourably with the three days limit usually exhibited by stainless steel autoclave nozzles.

Some of the powder compaction dies were used in a powder metallurgy plant to compact a particularly abrasive combination of copper powder, iron powder and manganese powder to make slugs for copper infiltrating iron and steel compacts during sintering. Such powder compaction dies are deemed to be worn out when the dimensional tolerances of the slugs reach unacceptable values. The dies that had the composition of sample 3 of Example 1 were found to have a lifetime of about four times that of the best prior art dies, which are made of tungsten carbide.

Other powder compaction dies were used to form sheep pellets from iron base metal powders (used for example, to correct trace element deficiencies in sheep) and were found to have a working life at least twice that of the conventional tungsten carbide dies used for this purpose, with complete absence of scoring.

EXAMPLE 3

An Intermediate-Temperature Application of the Present Invention

Magnesia partially stabilised zirconia products were made by the method of the present invention, in the form of extrusion dies. These products had the following parameters and fabrication process details:
Magnesia content—3.4 wt percent
Additive—strontia
Additive content—0.25 wt percent
Firing temperature—1700° C.
Ageing temperature—1100° C.
Time of ageing—6 hours
Ground surface monoclinic content—32 volume percent
Polished surface monoclinic content—26 volume percent
Grain boundary monoclinic content—9 volume percent
Grain matrix monoclinic content—16 volume percent A number of these dies were supplied, for testing, to an aluminium extruding company. That company reported that the dies had a significantly longer useful life than the conventional extruding dies used by the company.

EXAMPLE 4

To Illustrate a High Temperature Application of the Present Invention

A number of brass extrusion dies were made from zirconia using the method of the present invention, with the following manufacturing and process details:
Magnesia content—3.4 wt percent
Additive—strontia
Additive content—0.25 wt percent
Firing temperature—1700° C.
Ageing temperature—1100° C.
Time of ageing—9 hours
Ground surface monoclinic content—40 volume percent
Polished surface monoclinic content—35 volume percent
Grain boundary monoclinic content—10 volume percent
Grain matrix monoclinic content—25 volume percent These extrusion dies were supplied to a manufacturer of brass wire for an assessment of their suitability for commercial use. All the dies so supplied were reported to have a useful life which was substantially in excess of the brass extrusion dies which are currently available commercially.

INDUSTRIAL APPLICABILITY

Table 1 of this specification provides typical applications for the material of the present invention. However, the applications listed in Table 1 are not intended to be the only uses of the material of the present invention.

We claim:

1. A magnesia partially stabilised zirconia ceramic material having
   (a) a cubic phase zirconia content in the range from 70 percent (by volume) to 25 percent (by volume) of the ceramic material; and
   (b) a magnesia content in the range from 3.0 percent (by weight) to 3.65 percent (by weight) of the ceramic material;
the material being characterised in that:
   (c) it contains an additive which is selected from the group consisting of strontia, baria and rare earth oxides which are glass formers, with silica are insoluble in zirconia, and do not react with magnesia, and any mixture thereof, in the range from 0.05 percent (by weight) to 1.00 percent (by weight) of the ceramic material;
   (d) the microstructure of the material comprises grains of cubic stabilised zirconia, each grain containing precipitates of tetragonal zirconia which is transformable on the application of tensile stress or upon heat treatment to monoclinic zirconia, said precipitates being lenticular in shape and having an average length of about 150 nm in their longest dimension, and each grain containing grain matrix monoclinic zirconia as transformed tetragonal zirconia precipitates in a first specified range of monoclinic zirconia content;
   (e) a ground surface of the material contains monoclinic zirconia in a second specified range of monoclinic zirconia content;
   (f) a polished surface of the material contains monoclinic zirconia in a third specified range of monoclinic zirconia content;
said first, second and third specified ranges being selected from the group consisting of the following four combinations of ranges:
   (i) the first specified range of monoclinic zirconia content is from 0 to 10 percent (by volume), the second specified range is from 0 to 40 percent (by volume) and the third specified range is from 0 to 10 percent (by volume); whereby the ceramic material is especially suitable for use in low temperature applications;
   (ii) the first specified range of monoclinic zirconia content is from 5 to 40 percent (by volume), the second specified range is from 25 to 50 percent (by volume) and the third specified range is from 5 to 50 percent (by volume); whereby the ceramic material is especially suitable for use in the temperature range from 400° C. to 700° C.;
   (iii) the first specified range of monoclinic zirconia content is from 10 to 50 percent (by volume), the second specified range is from 25 to 60 percent (by volume) and the third specified range is from 10 to 60 percent (by volume); whereby the ceramic material is especially suitable for use in the temperature range from 700° C. to 1000° C.; and (iv) the first specified range of monoclinic zirconia content is from 15 to 60 percent (by volume), the second specified range is from 15 to 75 percent (by volume) and the third specified range is from 5 to 75 percent (by volume); whereby all the tetragonal precipitate has been transformed into monoclinic zirconia; whereby the ceramic material is especially suitable for use at temperatures in excess of 1000° C.

2. A magnesia partially stabilised zirconia material as defined in claim 1, in which the combination of first, second and third specified ranges is combination (i), further characterised in that:

the first specified range is from 9 to 5 percent (by volume);

the second specified range is from 15 to 30 percent (by volume);

the third specified range is from 0 to 5 percent (by volume); and the boundary between the grains has a monoclinic zirconia content of less than 2 percent (by volume) of the ceramic material.

3. A magnesia partially stabilised zirconia material as defined in claim 1, in which the combination of first, second and third specified ranges is combination (ii), further characterised in that:

the first specified range is from 5 to 25 percent (by volume);

the second specified range is from 25 to 45 percent (by volume);

the third specified range is from 10 to 35 percent (by volume); and the boundary between the grains has a monoclinic zirconia content in the range from 0 to 20 percent (by volume) of the ceramic material.

4. A magnesia partially stabilised zirconia material as defined in claim 3, in which the grain boundary monoclinic zirconia content is less than 10 percent (by volume).

5. A magnesia partially stabilised zirconia material as defined in claim 1, in which the combination of first, second and third specified ranges is combination (iii), further characterised in that:

the first specified range is from 10 to 40 percent (by volume);

the second specified range is from 30 to 60 percent (by volume);

the third specified range is from 25 to 60 percent (by volume); and the boundary between the grains has a monoclinic zirconia content in the range from 0 to 35 percent (by volume) of the ceramic material.

6. A magnesia partially stabilised zirconia material as defined in claim 5, in which the grain boundary monoclinic zirconia content is less than 15 percent (by volume).

7. A magnesia partially stabilised zirconia material as defined in claim 1, in which the combination of first, second and third specified ranges is combination (iv), further characterised in that:

the first specified range is from 20 to 45 percent (by volume);

the second specified range is from 35 to 65 percent (by volume);

the third specified range is from 35 to 65 percent (by volume); and the boundary between the grains has a monoclinic zirconia content in the range from 0 to 30 percent (by volume) of the ceramic material.

8. A magnesia partially stabilised zirconia material as defined in claim 7, in which the grain boundary monoclinic zirconia content is less than 20 percent.

9. A magnesia partially stabilised zirconia material as defined in claim 1, in which the additive content is in the range from 0.25 to 0.70 percent (by weight) of the ceramic material.

10. A magnesia partially stabilised zirconia material as defined in claim 1, in which the magnesia content of the material is in the range from 3.3 to 3.5 percent (by weight) of the ceramic material.

11. A magnesia partially stabilised zirconia material as defined in claim 1, further characterised in that the silica content of the material is less than 0.5 percent (by weight) of the ceramic material.

12. A magnesia partially stabilised zirconia material as defined in claim 1, further characterised in that the silica content of the material is less than 0.25 percent (by weight) of the ceramic material.

13. A magnesia partially stabilised zirconia material as defined in claim 1, further characterised in that the silica content of the material is less than 0.10 percent (by weight) of the ceramic material.

14. A method of making a magnesia partially stabilized zirconia ceramic material, characterized in that it comprises the steps of:

1. mixing and wet-milling a mixture of zirconium dioxide powder, magnesium oxide powder and an additive oxide powder containing no more than 1.0 percent by weight of silica, or materials capable of producing, on firing, zirconium dioxide, magnesium oxide and an additive oxide, said additive oxide being selected from the group consisting of strontia, baria and rare earth oxides which are glass formers with silica, are insoluble in zirconia and do not react with magnesia, and any mixture of said additive oxides, in proportions such that the effective magnesium oxide content comprises from 3.0 wt percent of 3.65 wt percent of the mixture and the additive oxide content of the mixture is in the range from 0.05 wt percent to 1.00 wt percent;

2. moulding the mixture into a desired shape;

3. firing the moulded mixture at a temperature of from about 1550° to about 1900°;

4. cooling the fired material from the firing temperature to about 1400° C. as rapidly as possible without cracking of the moulded article;

5. thereafter cooling the fired material from about 1400° C. to about 1000° C., at a rate which enables lenticular tetragonal precipitates to grow (on average) to about 150 nm in their longest dimension; and 6. thereafter allowing the material to cool to room temperature at a cooling rate which does not result in cracking of the product.

15. A method as defined in claim 14, in which, in the course of step 5, the cooling of the fired material is interrupted at least one temperature in the range from 1350° C. to 1050° C., and the fired material is held at the or each temperature at which cooling is interrupted for a period sufficient to permit the transformation of precipitates of tetragonal zirconia into monoclinic zirconia to proceed to the degree which ensures that the final product has a required content of monoclinic zirconia in its grain matrix.

16. A method as defined in claim 15, in which there are two temperatures at which cooling is interrupted, namely about 1350° C. and about 1100° C.

17. A method as defined in claim 15, in which there is one temperature at which cooling is interrupted, said one temperature being either 1350° C. or 1100° C.

18. A method as defined in claim 14, in which the cooling of the fired material from 1400° C. is effected relatively rapidly until the fired material has reached a temperature of about 800° C., whereupon the temperature of the fired material is increased to an ageing temperature in the range from about 1000° C. to about 1150° C., and the fired material is held at the ageing temperature for a period sufficient to permit the transformation of precipitates of tetragonal zirconia into monoclinic zirconia to proceed to the degree which ensures that the final product has a required content of monoclinic zirconia in its grain matrix.

19. A method as defined in claim 18, in which the ageing temperature is 1100° C.

* * * * *